(12) United States Patent
Haseltine et al.

(10) Patent No.: US 9,531,208 B2
(45) Date of Patent: Dec. 27, 2016

(54) CHARGING AND COMMUNICATING WITH BATTERY OPERATED TOYS

(71) Applicant: Disney Enterprises, Inc., Burbank, CA (US)

(72) Inventors: Eric Charles Haseltine, Silver Spring, MD (US); Joseph O'Brien Garlington, La Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 212 days.

(21) Appl. No.: 14/026,196

(22) Filed: Sep. 13, 2013

(65) Prior Publication Data
US 2015/0077065 A1 Mar. 19, 2015

(51) Int. Cl.
*H02J 7/00* (2006.01)
*H02J 7/02* (2016.01)

(52) U.S. Cl.
CPC .............. *H02J 7/0052* (2013.01); *H02J 7/025* (2013.01); *H02J 2007/0098* (2013.01)

(58) Field of Classification Search
USPC .......................................................... 320/108
See application file for complete search history.

(56) References Cited

U.S. PATENT DOCUMENTS

| 2005/0127866 | A1* | 6/2005 | Hamilton | G06K 7/10891 320/108 |
| 2007/0114967 | A1* | 5/2007 | Peng | H02J 7/025 320/101 |
| 2011/0156640 | A1* | 6/2011 | Moshfeghi | 320/108 |
| 2014/0176061 | A1* | 6/2014 | Cheatham et al. | 320/108 |

* cited by examiner

*Primary Examiner* — Eric Lee
(74) *Attorney, Agent, or Firm* — Patterson + Sheridan, LLP

(57) ABSTRACT

Methods and a system for the recharging of battery-operated devices, whereby the recharging process is made less burdensome and inconvenient to the users of the devices. Embodiments provide for incorporating recharging into the normal usage patterns for the devices using activities consistent with predetermined intended usage of the devices, thereby causing the user to perceive less inconvenience. Other embodiments provide for systematically detecting and wirelessly recharging devices, whereby the burden to the users may be reduced or entirely eliminated.

20 Claims, 7 Drawing Sheets

CHARGING AND COMMUNICATING WITH BATTERY OPERATED TOYS

BACKGROUND

Field of the Invention

Embodiments presented in this disclosure generally relate to techniques for recharging battery-operated devices, and more specifically, to integrating recharging into the patterns of normal usage of the devices, and to systematic detection and recharging of devices.

Description of the Related Art

Battery-operated devices are ubiquitous in today's technologically-oriented and increasingly mobile society. However, certain characteristics inherent to battery-operated devices can be substantially disruptive to consumers' use and enjoyment of these devices, and at the very least may be annoying to consumers.

Many devices use traditional battery technologies, such as alkaline or zinc-chloride cells that are intended to be discarded after a single use, and are available in well-known standardized sizes, such as "AA," "AAA," "C," and "D." While fairly easy to obtain batteries in these standard sizes, the batteries must be changed in devices relatively frequently, imposing a cost and a hassle on consumers. Rechargeable batteries, which are typically available in the same standard sizes, can alleviate some of the recurring costs of purchasing new batteries, but can introduce different issues. For instance, unless multiple sets of rechargeable batteries are available, the device will be unusable during the period when the batteries are being recharged, and the device may also lose any information stored in volatile memory. Even rechargeable batteries that are integrated into the devices, which are not designed for frequent removal or replacement, often still make using the device inconvenient during the recharging process, if the device is not entirely unusable.

SUMMARY

Embodiments of the invention generally relate to methods and a system for recharging battery-operated devices, whereby the recharging process is less burdensome and inconvenient to the user.

Embodiments may provide a method for recharging a battery-operated device by integrating the recharging process into the patterns of normal usage of the device by using charging devices and activities that are consistent with predetermined intended usage of the device, thereby decreasing the inconvenience perceived by the user.

Embodiments may further provide a method for detecting and wirelessly recharging a battery-operated device by systematically scanning using a charging device, thereby decreasing the burden and inconvenience to the user.

Embodiments may further provide a system for detecting and wirelessly recharging a battery-operated device by systematically scanning using a charging device, thereby decreasing the burden and inconvenience to the user.

BRIEF DESCRIPTION OF THE DRAWINGS

So that the manner in which the above recited aspects can be understood in detail, a more particular description of embodiments of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
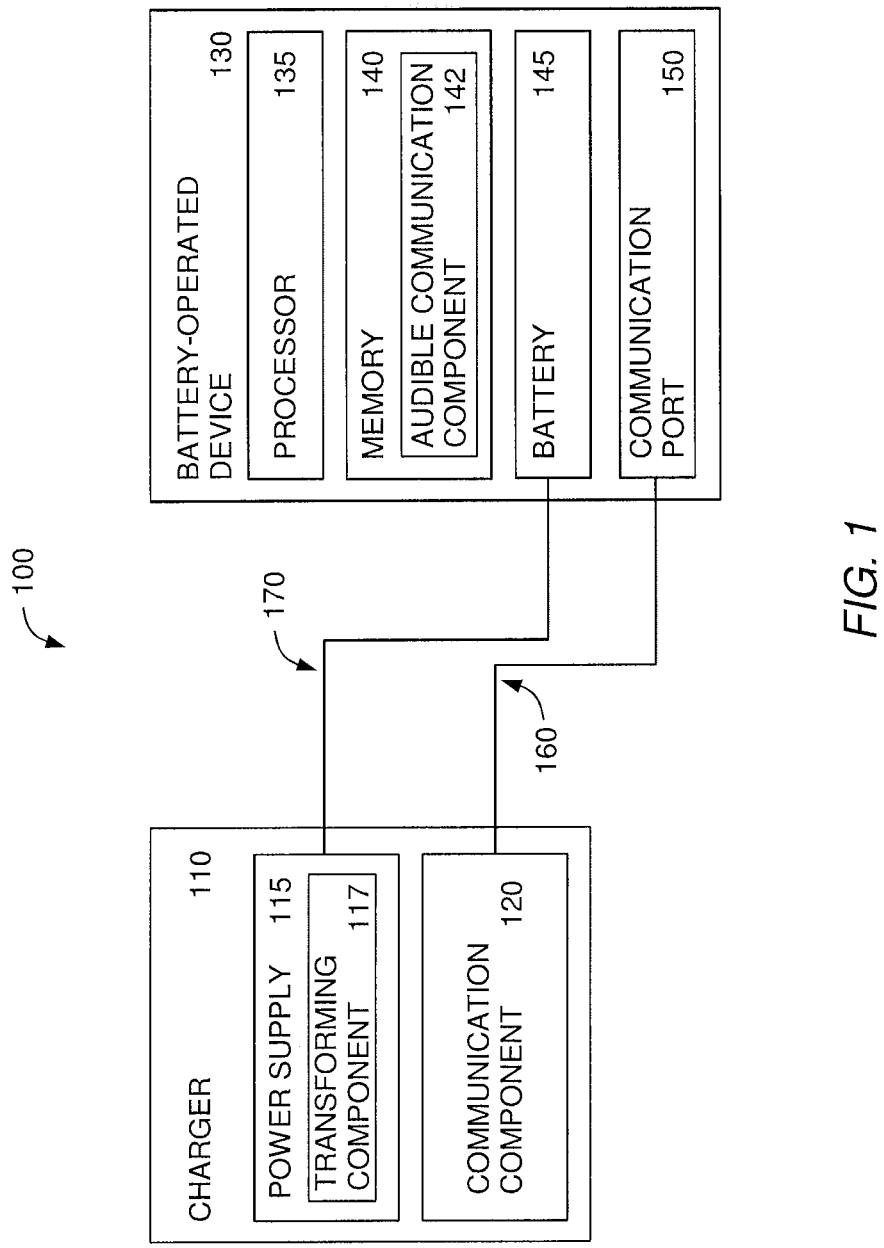
FIG. 1 illustrates a battery-operated device and a charging device, according to embodiments described herein.

To make the process of recharging battery-operated devices less burdensome and inconvenient to users, the recharging process may be incorporated into the normal usage patterns for the device. Especially in the case of devices that are designed for use within an interactive environment, the ability to integrate the necessary, functional requirement of recharging batteries into users' normal interaction with the devices directly enhances the interactive quality of the devices and the realism of the interactive environment. The interactive environment itself may be used to shape users' behavior; for example, the recharging of battery-operated devices may be accomplished as part of (or in response to) a story, a game, play, or dialog presented to users within the environment. When engaged within the interactive environment, users may be less likely to realize the ordinary or functional nature of their actions (i.e., recharging a battery), or perhaps may be more willing to engage their imagination and suspend disbelief about the nature of the actions, and thus the devices and the interactive environment may seem more "alive" or "real" to the users.

By incorporating the recharging process into normal usage patterns for the battery-operated device, regardless of any actual difference in effort required by the user or the unavailability of the device during the charging process, the user at least perceives recharging to be less inconvenient. Incorporating recharging into normal usage patterns may generally be accomplished by providing a charging device that appears thematically consistent with the device and by requesting activities that are also consistent with the predetermined intended usage of the device and with the charging device. In one embodiment, described more fully below, a toy doll (i.e., the battery-operated device) may be recharged by placing the doll onto a charging device designed to appear like a bed for the doll. In a particular embodiment, a user is prompted to place the doll into the "charging bed" by causing the doll to indicate that its battery requires recharging by requesting to be placed in bed. The doll may make such a request implicitly by stating that it is "sleepy,"

implying that the user should place the doll in its bed. By using the activity of putting the doll to bed as the method of recharging the doll, an activity that is consistent with the predetermined intended usage of a doll, the user will likely perceive the request to charge the device as unremarkable (or even as an enjoyable interaction with the doll), and therefore will feel less inconvenienced by the request.

The requested activities need not be limited to only those activities that would suggest rest or inactivity for the device. Indeed, any feasible activity that is consistent with predetermined intended usage of the device is contemplated to be used to recharge the device. Continuing with the example of the doll, an alternate embodiment may use a tea set as the charging device, so that having a tea party with the doll (i.e., placing the doll sufficiently close to the tea set) may be used to charge the doll's battery.

Additionally or alternatively, the process of recharging battery-operated devices can be made less burdensome and inconvenient to users by systematically detecting and wirelessly recharging devices, thereby decreasing the amount of effort required by users to recharge these devices. Advantageously, the process of systematic detection and recharging could drastically reduce or even eliminate the amount of user effort.

The invention contemplates a charging system that is capable of periodic or continuous sensing of proximately located battery-operated devices. Upon detecting a given battery-operated device, the charging device initiates a charging process. During that process, the battery-operated device may be completely unusable or may continue to maintain some level of interaction with a user (such as by emitting periodic audible messages or sounds indicative of its charge state).

An example configuration for a battery-operated device and associated charging device is shown in FIG. 1, which illustrates a device charging system 100 containing a charger 110 coupled with a battery-operated device 130, according to one embodiment described herein. As shown, charger 110 comprises a power supply 115 and communication component 120. The power supply 115 is generally configured to receive a power signal having certain characteristics, and based on the target device to be powered by the supply, may transform the signal to have characteristics suitable for the target device. The power supply 115 may receive an AC or DC power signal from an external source (e.g., a wall outlet) or may have an internal power source (e.g., a battery). The power supply 115 includes a transforming component 117 that is capable of transforming voltage, frequency, and/or other signal characteristics of AC or DC power signals to values suitable for use with the target device.

The communication component 120 is generally configured to transmit one or more signals from the charger 110 to one or more battery-operated devices 130. This may include transmitting a power signal generated at the power supply 115 to the one or more battery-operated devices 130, and/or data signals from the power supply 115 to the one or more battery-operated devices 130, using known communications protocols. For example, during the charging process, communication component 120 may be further configured to download new firmware or new media content to an electronic book (i.e., a battery-operated device 130). As shown, a data communication channel 160 couples communication component 120 with communication port 150, and a separate power supply channel 170 couples power supply 115 to battery 145. In another embodiment, a single, common channel may be used to transmit both power and data signals between the charger 110 and battery-operated device 130; e.g. both power and data signals may be transmitted using the same wire or may both be transmitted wirelessly.

Communication component 120 may be configured to transmit signals to the devices wirelessly, or through a wired connection, or both. Communication component 120 may use any feasible technique to transmit signals wirelessly, for example, by inductive charging.

As shown, the battery-operated device 130 includes a processor 135, a memory 140, a battery 145, and a communication port 150. The processor 135 may be any processing element capable of performing the functions described herein. The processor 135 represents a single processor, multiple processors, a processor with multiple cores, and combinations thereof. The memory 140 may be either volatile or non-volatile memory and include RAM, flash, cache, disk drives and the like. Although shown as a single entity, the memory 140 may be divided into different memory storage elements such as RAM and one or more hard disk drives. As shown, the memory 140 includes an audible communication component 142. The battery 145 may include any type of rechargeable energy storage, such as conventional rechargeable battery technologies (e.g., lead acid, nickel cadmium (NiCd), nickel metal hydride (NiMH), and lithium ion batteries) and capacitive energy storage technologies. Battery 145 may be comprised of one or more rechargeable devices, and may also be comprised of different devices (e.g., a bank of capacitors in combination with a NiMH battery). Communication port 150 facilitates communication between the battery-operated device 130 and a coupled charger 110. Although shown as a single port, communication port 150 may comprise a plurality of ports and may support communications between the battery-operated device 130 and a plurality of other devices. Audible communication component 142 generally may be configured to use processor 135 and memory 140 to generate speech, or to playback sounds or phrases, according to any number of techniques.

Figure 2A:
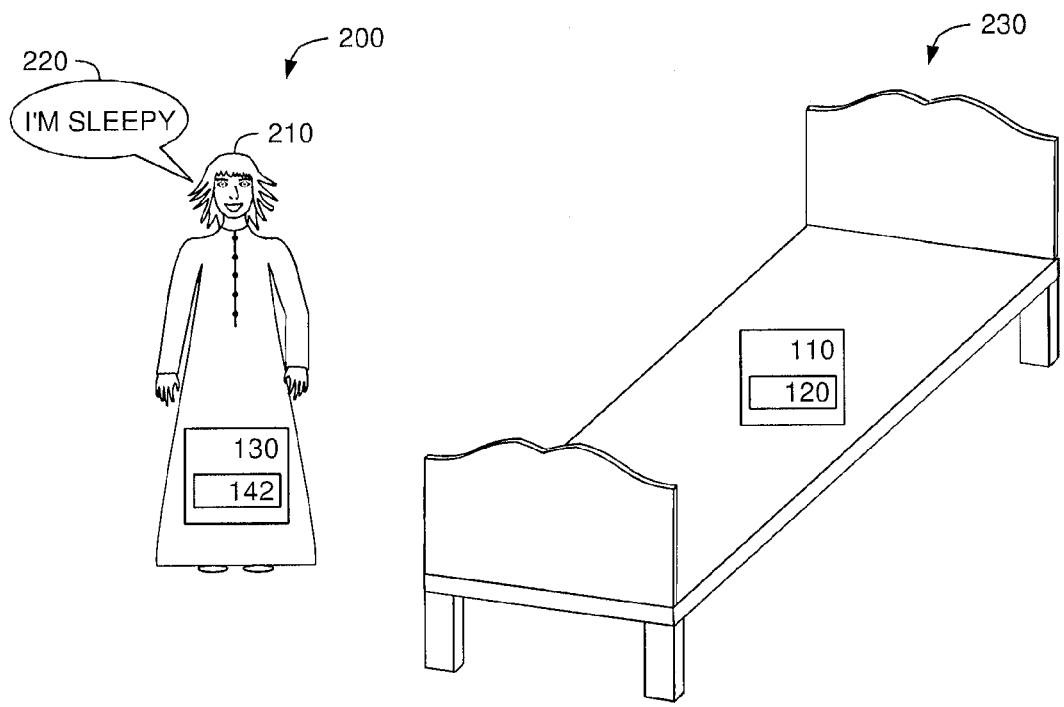
FIGS. 2A-2D each illustrate a battery-operated device and a charging device, according to embodiments described herein.
Figure 2B:
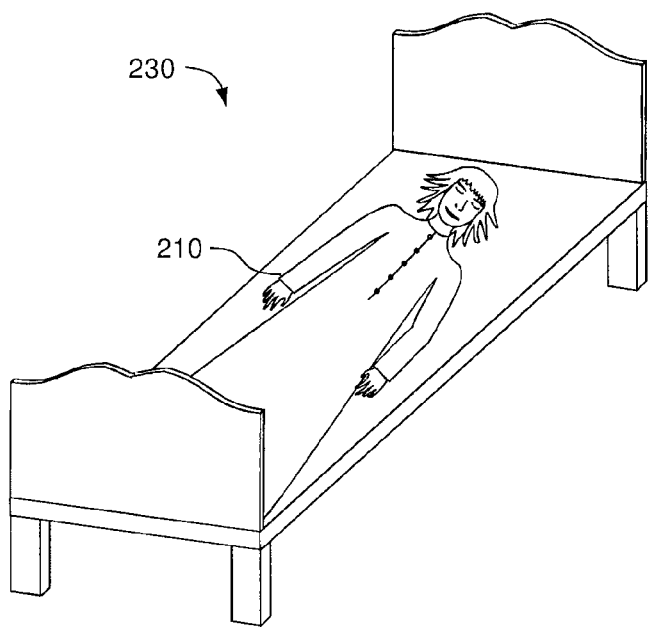

An example of such an embodiment will now be discussed with respect to FIGS. 2A through 2D. FIGS. 2A and 2B illustrate a device charging system 200 comprising a battery-operated device with a thematically consistent charging device, according to an embodiment described herein. As shown, the battery-operated device is a child's doll 210, and the charging device is a bed 230. While this example is a toy, any other battery-operated device having a suitable context for charging devices and activities consistent with predetermined intended usage of the battery-operated device is specifically contemplated to fall within the scope of the present disclosure.

The doll 210 includes the various components described above as comprising a battery-operated device 130, and notably includes an audible communication component 142 for communication with the user. Bed 230 includes a charger 110. In this example, the communication component 120 of bed 230 is configured to transmit signals wirelessly to the communication port 150 of doll 210.

During normal usage of the doll 210 (e.g., as a child might ordinarily play with a doll), doll 210 may use its audible communication component 142 to talk (whether by prerecorded phrases or a speech generating functionality) and to make other sounds (e.g., singing or laughing). The doll 210 may also generally interact with the user or users, with other objects, and with its environment.

In alternate embodiments, battery-operated devices 130 may be additionally or alternatively configured to communicate using methods other than audible communication, such as visible communication using a display or one or more lights, as well as tactile feedback according to any number of techniques.

As shown in FIG. 2A, during normal usage of the doll 210 the charge in its battery will deplete if the doll 210 is not coupled to the charger of bed 230. Charge may also deplete over time even though the doll 210 is not being used. When the battery charge decreases to a predetermined level, the doll 210 may indicate to the user that it has reached a low battery state and needs to be recharged. The doll 210 may indicate its low battery state by speaking an explicit request to the user to place the doll onto the bed. The doll 210 may also implicitly make a request to be coupled to the bed by taking another action that is consistent with placing the doll in physical proximity of the bed, such as by saying "I'm sleepy" as shown in speech bubble 220, or by making a yawning sound or other distinctive sound.

In one or more embodiments, the interactive nature of the recharging process may be enhanced by providing additional incentives for the user to couple a battery-operated device 130 to a charger 110. In one embodiment, doll 210 and bed 230 are integrated components within an interactive game or program, and a user may be rewarded within the game/program for performing the activity requested by the doll. For example, if the user places doll 210 into bed 230 within a certain time after the request is made, the interactive game or program may award points to the user or unlock new features within the game that the user may then interact with, thus enhancing the user's experience.

As shown in FIG. 2B, the recharging process may begin when the user places the doll 210 on or in proximity of the bed 230 such that the doll 210 and the bed 230 are communicatively coupled. The recharging process may begin by transmitting a charging signal from communication component 120 of the bed 230 wirelessly to the communication port 150 of the doll 210; as described above, in alternate embodiments, the charging signal may be transmitted over a dedicated power supply channel 170 to the battery 145. During the charging process, the doll 210 may continue to be interactive with a user by, for example, transmitting audio phrases like "that feels good" or "I'm ready to play again."

To help maintain the coupling necessary during the recharging process, the charging devices described herein may be further configured to physically retain their associated battery-operated devices. For example, one or more magnets may be embedded into the bed 230, and one or more magnets into the doll 210, so that when the doll 210 is placed onto bed 230, magnets in the bed attract to the magnets in the doll. Any other feasible means of physical retention of the battery-operated device may alternately or additionally be used. For example, the bed 230 may also include rails along its sides. Such physical retention ensures that the doll and bed will remain within a sufficient physical proximity of each other, and will thereby maintain the communicative coupling so that recharging may continue. Additionally, using physical retention means may improve the efficiency of the charging process; using the example of embedded magnets, the magnets may be located in doll 210 and bed 230 such that the communications elements of doll 210 and bed 230 are aligned when the magnets are aligned, whereby a stronger charging signal may be transmitted and received.

Figure 2C:
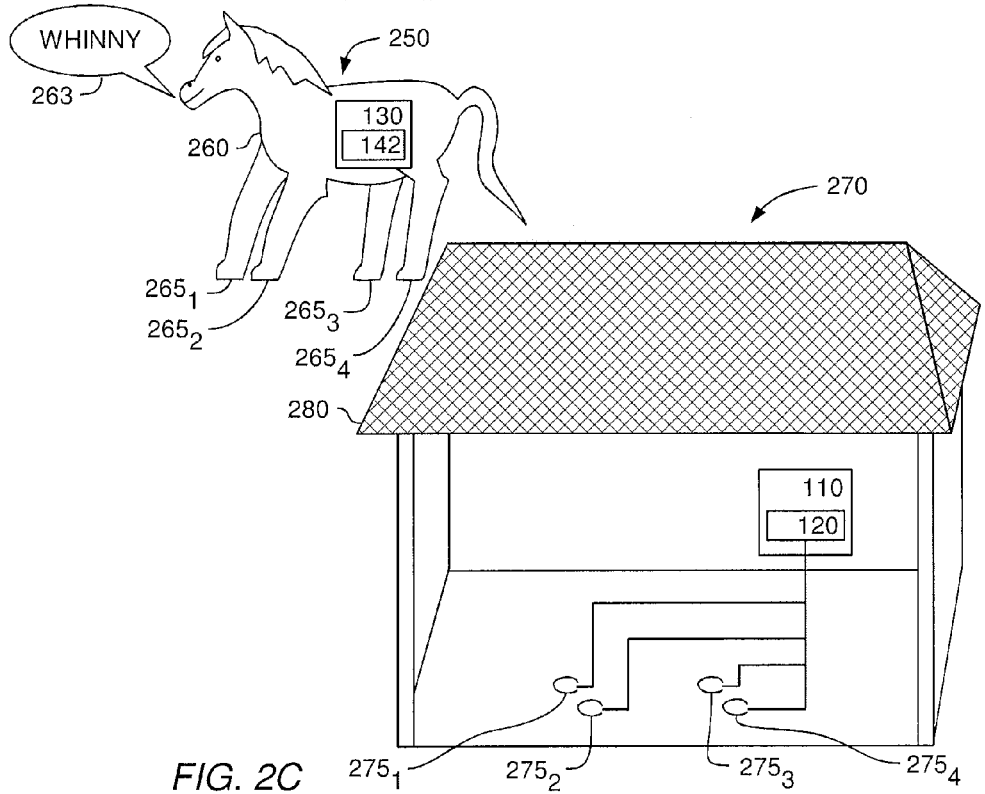
Figure 2D:
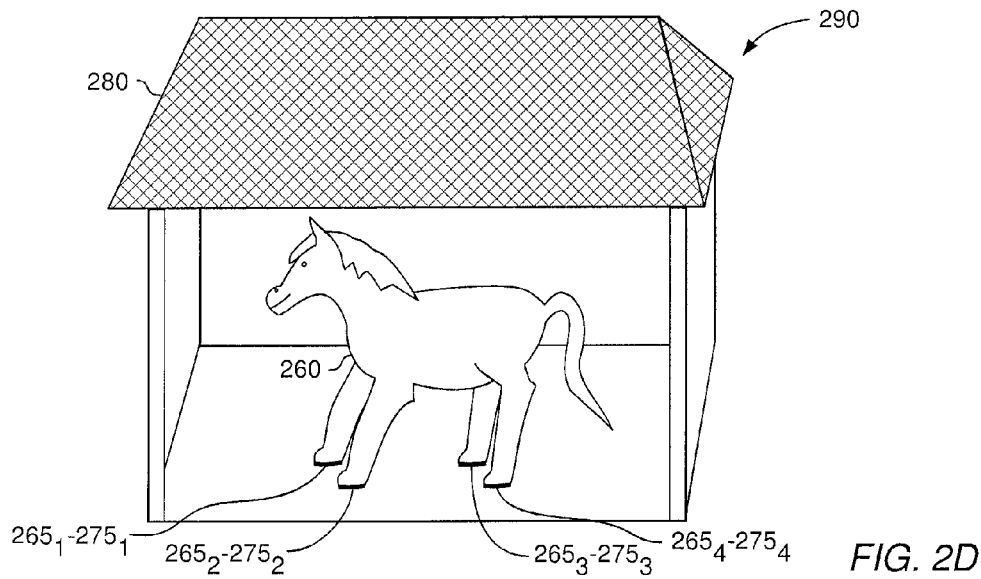

While the example of FIGS. 2A and 2B described a charger and battery-operated device that were wirelessly coupled, other embodiments may provide for wired coupling between the charger and battery-operated devices. FIGS. 2C and 2D illustrate a device charging system 250 comprising a battery-operated device with a thematically consistent charging device. As shown, the battery-operated device is a toy horse 260, and the charging device is a stable 280.

The horse 260 includes the various components described above as comprising a battery-operated device 130, and also includes an audible communication component 142 for communication with the user. Notably, horse 260 comprises horseshoe-shaped electrodes $265_{1-4}$ which are configured to at least receive power signals, thereby charging its battery. In alternate embodiments, electrodes $265_{1-4}$ may also facilitate transmitting and receiving data signals. Stable 280 includes the various components described above as comprising a charger 110. In this example, the communication component 120 of stable 280 is configured to transmit signals through electrodes $275_{1-4}$ to the communication port 150 of horse 260.

During normal usage, horse 260 may use audible communication component 142 to generate sounds, and may also generally interact with the user or users, with other objects, and with its environment.

When its battery charge decreases to a predetermined level, the horse 260 may indicate to the user that it has reached a low battery state and needs to be recharged. The horse 260 may generally be configured to use the same or similar techniques for indicating a low battery state to a user as were described above with respect to doll 210. In this example, the horse 260 makes a distinctive sound (shown in speech bubble 260 as "Whinny") to indicate that the horse 260 has reached a low battery state.

As shown in FIG. 2D, the recharging process may begin when the user places the horse 260 into the stable 280 and physically (and communicatively) couples electrodes $265_{1-4}$ with electrodes $275_{1-4}$. The recharging process may begin by transmitting a charging signal from communication component 120 of the stable 280 through the coupled electrodes to the communication port 150 of the horse 260.

As in the earlier example of doll 210 and bed 230, stable 280 may be configured to physically retain horse 260 when coupled to the electrodes $275_{1-4}$. In this example, one or more magnets may be embedded into the hooves of horse 260 and one or more magnets into the stable 280. The magnets may be separate from electrodes $265_{1-4}$ or may replace one or more of the electrodes (e.g., two of the "horseshoes" are electrodes and two are magnets). Any other feasible means of physical retention of the horse 260 may alternately or additionally be used to maintain the communicative coupling and/or to improve the efficiency of the coupling.

Figure 3:
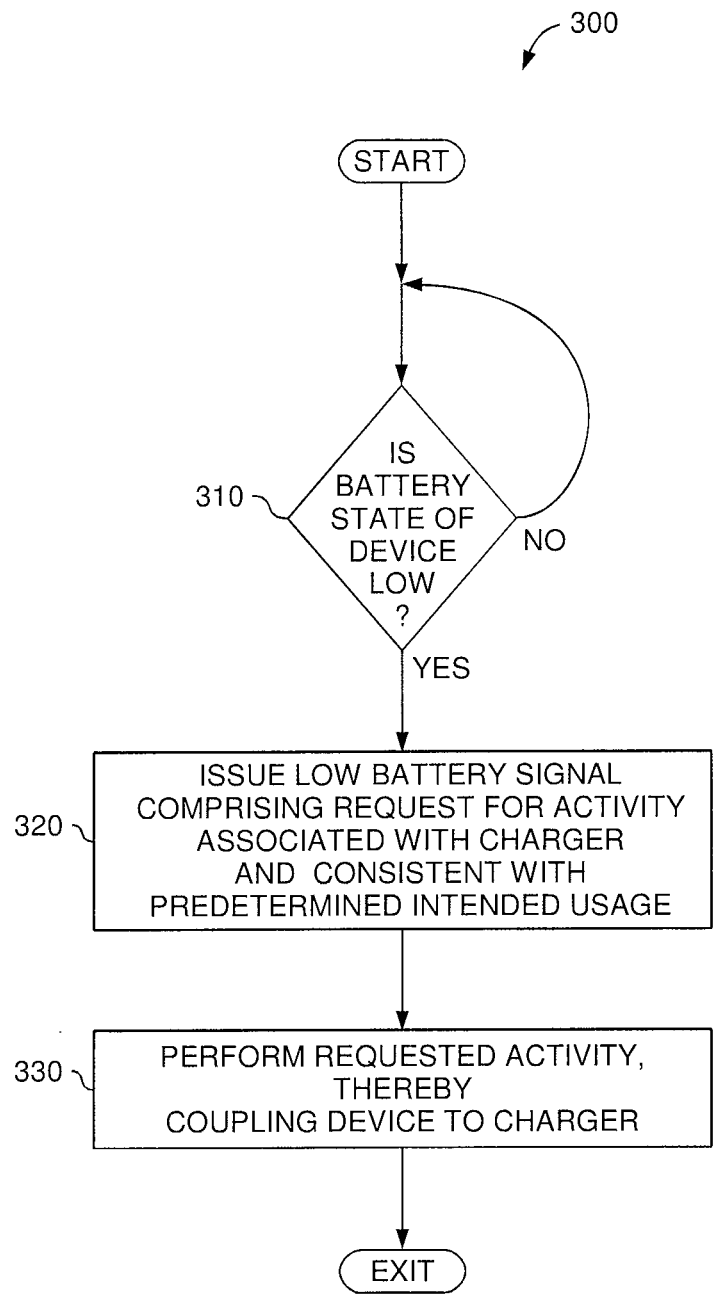
FIG. 3 illustrates a method for recharging a battery-operated device, according to embodiments described herein.

FIG. 3 illustrates a method for recharging a battery-operated device, according to embodiments described herein. The method 300 generally reflects the approach described above with respect to the examples in FIGS. 2A and 2B. Method 300 begins at block 310, where the battery state of a device is queried. If the battery state is determined to be low, method 300 proceeds to block 320. At block 320, the low battery state is indicated to a user by generating a request for an activity associated with the charger and consistent with predetermined intended usage of the device. In response to the generated request at block 320, at block 330 a user may perform the requested activity, which couples the device to the charger and begins the recharging process. Method 300 ends with the termination of the recharging process.

Figure 4:
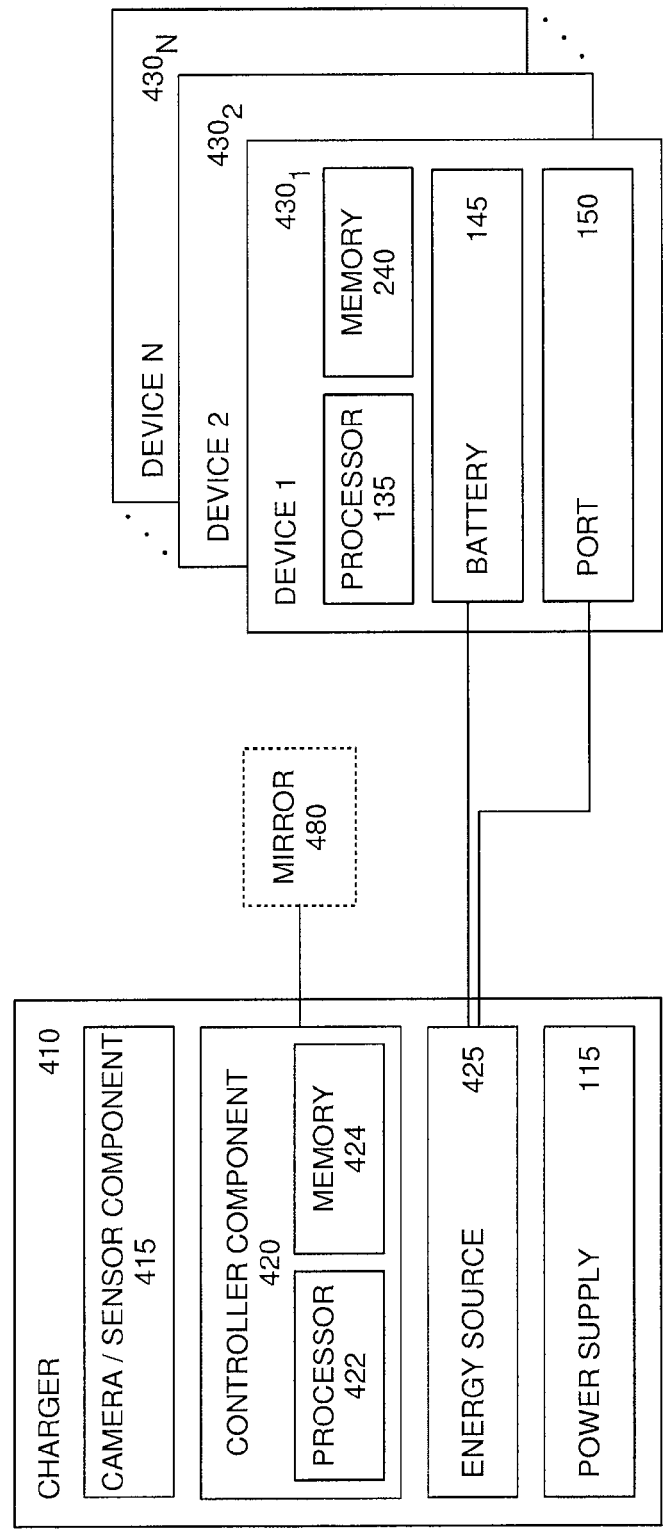
FIG. 4 illustrates a system for wirelessly recharging one or more battery-operated devices, according to embodiments described herein.

Another example configuration for a battery-operated device and associated charging device is shown in FIG. 4, which illustrates a device charging system 400 containing a charger 410 coupled with battery-operated devices $430_{1-N}$, according to one embodiment described herein. In this embodiment, charger 410 comprises a power supply 115, a camera/sensor component 415, a controller component 420 comprising a processor 422 and memory 424, and an energy source 425. Power supply 115 may generally be configured to operate in the same manner as described above with respect to FIG. 1. Camera/sensor component 415 may generally be configured to receive a signal, and may be coupled with controller component 420. Camera/sensor component 415 may include any feasible sensing device or combination of devices, and may include one or more of an infrared (IR) sensor, a LIDAR sensor, a visible light camera, a thermal imaging device, and a charge coupled device. Controller component 420 may generally be configured to receive and process input from the camera/sensor component 415 and to generate and transmit output using energy source 425. Controller component 420 may further be configured to conduct a scan for the presence of battery-operated devices $430_{1-N}$. For example, the controller component 420 may be configured to control rotation of the camera/sensor component 415, or the controller component 420 may be configured to control rotation of one or more mirrors 428 configured to reflect light to the camera/sensor component 415. Energy source 425 may be configured to provide only the charging signal to the battery-operated devices $430_{1-N}$, or may additionally transmit a scan signal during the scan. Energy source 425 may be configured to transmit electromagnetic signals at any feasible wavelength, including radio, microwave, visible light, and IR wavelengths, and may further be configured to transmit signals on a common wavelength or wavelengths with camera/sensor component 415. In some embodiments, energy source 425 may be configured to transmit a beam of collimated light in visible or IR wavelengths. The mirrors 428 may be matched specifically to the selected signal wavelengths; for example, a "hot mirror" (i.e., a mirror specifically designed to reflect IR light while passing visible light) may be chosen to reflect IR signals. The camera/sensor component 415 and the energy source 425 may be configured to maintain alignment relative to each other; in one embodiment using an IR light source and an IR camera, the camera/sensor component 415 and the energy source 425 may be boresighted by aligning the focus of the IR camera with the beam delivered by the IR light source at a predetermined distance.

Energy source 425 may be configured to transmit one or more signals from the charger 410 to the one or more battery-operated devices $430_{1-N}$. This may include transmitting a charging signal and/or data signals to the one or more battery-operated devices $430_{1-N}$ using known communications protocols. For example, during the charging process, energy source 425 may be further configured to download new firmware or new media content to one of the battery-operated devices $430_{1-N}$. As shown, charging signals and data signals may be transmitted using separate channels, or in another embodiment, a single, common channel may be used to transmit both power and data signals between the charger 410 and battery-operated devices $430_{1-N}$. In other embodiments, the charging signal and the data signal may be combined and transmitted as one signal.

As shown, the battery-operated devices $430_{1-N}$ each include a processor 135, a memory 140, a battery 145, and at least one communication port 150. These components may generally be configured to operate in the same manner as described above with respect to FIG. 1.

Figure 5A:
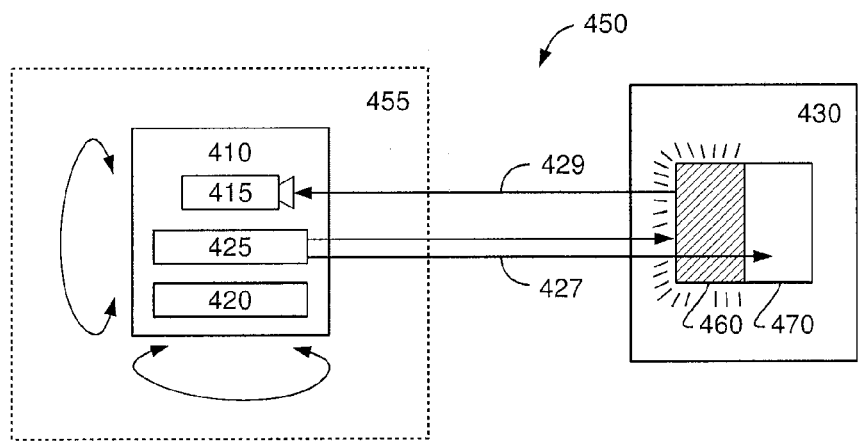
FIGS. 5A and 5B each illustrate the operation of a wireless recharger with an associated battery-operated device, according to embodiments described herein.

An example of such an embodiment will now be discussed with respect to FIGS. 5A and 5B. FIG. 5A illustrates a wireless device charging system 450 comprising a battery-operated device 430 and an associated charger 410, according to an embodiment described herein. Charger 410 may be a standalone device, or may be a component integrated into another device (shown as 455); for example, the charger 410 may be integrated into a multi-function projection device.

In this example, controller component 420 may cause charger 410 to scan the area for battery-operated devices 430 by controlling the rotation of charger 410. The scan may be conducted by adjusting the charger 410 according to known scan patterns, and may comprise any feasible pattern. The controller component 420 may be configured to rotate the charger 410 by one or more of panning, tilting, and rolling the charger 410. The scan may continue until a signal is received at the camera/sensor component 415, which generally indicates the presence of a compatible battery-operated device 430. In several embodiments, the energy source 425 of the charger 410 may transmit a scan signal 427 while conducting the scan, which is intended to be received by one or any present battery-operated devices 430. The scan signal 427 may generally have the same characteristics as the charging signal, or may differ from the charging signal according to various concerns; for example, the scan signal may be transmitted with less power than the charging signal due to concerns of energy cost or conservation. In alternate embodiments, the various signals transmitted between charger and device may be transmitted at different wavelengths within the same band, so that individual signals are more easily distinguishable.

The signal received at the camera/sensor component 415 may be generated and transmitted by the battery-operated device 430, or in some embodiments, the received signal may be comprised of energy reflected from the scan signal that was transmitted by the energy source 425 of charger 410. As shown in the embodiment depicted in FIG. 5A, battery-operated device 430 may comprise a reflector 460 and a sensor 470. The reflector 460 and sensor 470 may be matched specifically to the selected signal wavelengths; for example, reflector 460 may be an IR reflector, which reflects IR signals transmitted by the energy source 425, and sensor 470 may be a photovoltaic cell capable of sensing light in IR and visible wavelengths. So then, energy source 425 may transmit a scan signal 427 which is received at both the reflector 460 and sensor 470. Reflector 460 may then reflect the scan signal 427 as reflected signal 429, which will be detected by the camera/sensor component 415 of the charger 410. Upon detecting the reflected signal 429 (i.e., detecting energy emitted by the battery-operated device), controller component 420 may pause the scan (i.e., cease the rotation of charger 410) and cause energy source 425 to begin transmitting a charging signal to the detected battery-operated device 430. As a known relative alignment may be maintained between camera/sensor component 415 and energy source 425, detection of a signal at the camera/sensor component 415 likely indicates that the battery-operated device 430 can be successfully charged while maintaining energy source 425 at its current position or by making a known adjustment to its position.

The charging signal may be transmitted to the battery-operated device 430 in the same manner as shown for scan signal 427. The charging signal may be terminated in any feasible manner; for example, the charging signal may be transmitted for a predetermined amount of time, or the charging signal may be terminated upon receiving a signal from battery-operated device 430 indicating that its battery 145 is full. For example, battery-operated device 430 may include an IR LED (not shown) controlled by processor 135 that lights or flashes when the battery 145 reaches a full state. Upon detecting the full battery signal at camera/sensor component 415, controller component 420 may terminate transmission of the charging signal and resume the scan. The process may generally repeat as additional devices are detected and charged during the scan.

Figure 5B:
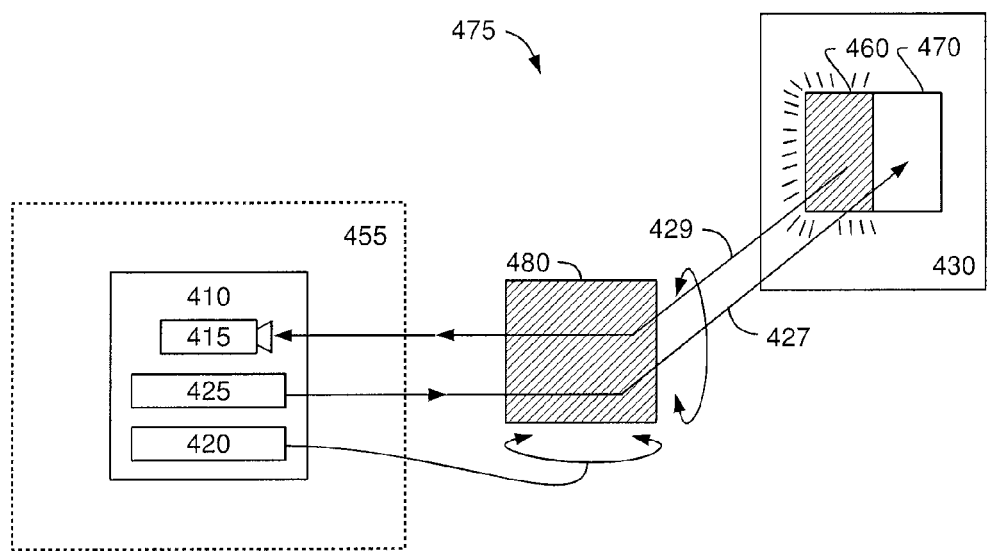

FIG. 5B illustrates a wireless device charging system 475 comprising a battery-operated device 430 and an associated charger 410, according to an embodiment described herein. The wireless device charging system 475 generally operates according to the same principles and in the same manner as the wireless device charging system 450. In this embodiment, the controller component 420 is instead configured to conduct the scan for battery-operated devices 430 by controlling the rotation of one or more mirrors 480 relative to the energy source 425 and/or the camera/sensor component 415. The controller component 420 may be configured to rotate the one or more mirrors 480 by one or more of panning, tilting, and rolling the one or more mirrors 480.

Camera/sensor component 415 may receive a signal during the scan; as described previously with respect to FIG. 5A, the received signal may be generated and transmitted by battery-operated device 430 or may be reflected from a scan signal 427 transmitted by the energy source 425. Energy source 425 may be oriented such that the scan signal 427 is reflected off the one or more mirrors 480 prior to reaching the reflector 460 and sensor 470. The reflected signal 429 may then reflect off of the one or more mirrors 480 prior to being detected at the camera/sensor component 415. Upon detecting the reflected signal 429, controller component 420 may pause the scan (i.e., cease the rotation of the one or more mirrors 480) and cause energy source 425 to begin transmitting a charging signal via the one or more mirrors 480 to the detected battery-operated device 430. As described above, the charging process may terminate in any feasible manner, and may include receiving a signal from battery-operated device 430 via the one or more mirrors 480. Controller component 420 may then resume the scan, and repeat the process as additional devices are detected.

Figure 6:
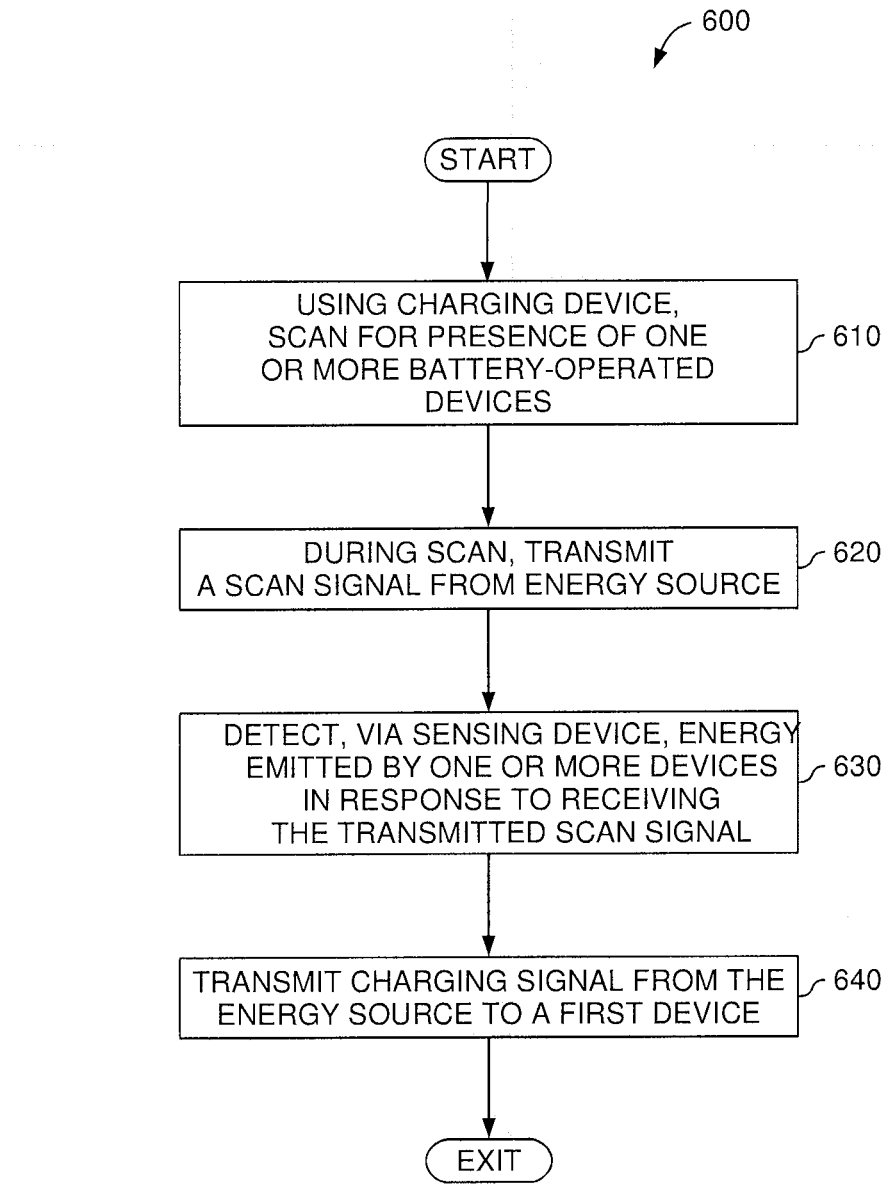
FIG. 6 illustrates a method for wirelessly recharging a battery-operated device, according to embodiments described herein.

FIG. 6 illustrates a method for recharging a battery-operated device, according to embodiments described herein. The method 600 generally reflects the approach described above with respect to the examples in FIGS. 5A and 5B. Method 600 begins at block 610, where a charging device scans its surroundings for the presence of one or more battery-operated devices. The charging device may include a rotatable camera or other sensor configured to detect the presence of a battery-operated device by sensing energy emitted from such a device. Block 620 may occur concurrently with the scan, in which the energy source 425 of the charging device transmits a scan signal. At block 630, the camera/sensor component 415 detects energy emitted by one or more battery-operated devices 430 in response to receiving the transmitted scan signal. Upon detecting the presence of a battery-operated device 430 by receiving the emitted energy, the charging device may pause its scan, essentially keeping the charging device oriented toward the battery-operated device, and may then send a charging signal to a first battery-operated device 430. At block 640 the charging signal is transmitted from the energy source 425 to the first device, thereby beginning the charging process. Method 600 ends with the termination of the charging process. The charging device may terminate the charging process when the battery-operated device 430 indicates its battery is full. During the charging process, the battery-operated device may continue to be interactive with a user by, for example, transmitting audio phrases like "that feels good" or "I'm ready to play again." Following termination of the charging process, the charging device may resume its scan, and repeat the recharging process when another battery-operated device is detected.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and block diagrams of methods, apparatus (systems) and computer program products according to embodiments of the invention. It will be understood that each block of the flowchart illustrations and block diagrams, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and block diagram block or blocks.

In view of the foregoing, the scope of the present disclosure is determined by the claims that follow.

What is claimed is:

1. A method for recharging a battery-operated device associated with one or more users, the method comprising:
issuing, from the battery-operated device and responsive to determining a low battery state of a battery of the battery-operated device, an audible user request to perform an activity associated with a charger device, the requested activity being consistent with a non-charging, predetermined intended usage of the battery-operated device and without explicitly requesting that the battery-operated device be charged; and
upon the requested activity being performed, thereby coupling the device to the charger device, charging the battery via the coupling.

2. The method of claim 1, wherein the charger device has an appearance consistent with the predetermined intended usage of the battery-operated device, wherein performing the requested activity comprises moving the battery-operated device in proximity of the charger device such that the battery-operated device and the charger device are communicatively coupled.

3. The method of claim 2, wherein the battery-operated device and the charger device are galvanically coupled via one or more electrodes, and wherein the one or more electrodes are configured to appear thematically consistent with the battery-operated device in one or more of shape, location on the device, and orientation.

4. The method of claim 2, wherein the battery-operated device and the charger device are wirelessly coupled.

5. The method of claim 4, wherein the battery-operated device is charged through inductive charging.

6. The method of claim 2, wherein the charger device is further configured to physically retain the battery-operated device when the battery-operated device is placed in physical proximity of the charger device.

7. The method of claim 6, wherein the charger device and the battery-operated device each comprise one or more magnets that are configured to align, whereby the charger device physically retains the battery-operated device.

8. A method for systematically detecting and wirelessly recharging one or more battery-operated devices disposed within an environment, the method comprising:
transmitting a light-based scan signal using an energy source of a charging device, the charging device further comprising a sensing device;
performing a scan of the environment using the charging device, wherein performing the scan comprises reorienting the scan signal within the environment;
detecting, during the scan and via the sensing device, a reflected scan signal reflected by a reflector of a first battery-operated device, wherein detecting the reflected scan signal corresponds to a first orientation of the scan signal;
upon detecting the reflected scan signal:
pausing the scan of the environment; and
transmitting, with a predetermined second orientation relative to and different than the first orientation, a charging signal from the energy source to a sensor of the first battery-operated device;
receiving, at the sensing device, a second signal from a light source of the first device indicating that a battery of the first battery-operated device is fully charged; and
ceasing transmission of the charging signal in response to the received second signal.

9. The method of claim 8, wherein the charging device further comprises one or more mirrors configured to further reflect the reflected scan signal to the sensing device, wherein reorienting the scan signal comprises rotating the one or more mirrors relative to the energy source, and wherein the one or more mirrors are configured to rotate by performing at least one of pan, tilt, and roll.

10. The method of claim 9, wherein the charging signal is transmitted to the first battery-operated device using the one or more mirrors.

11. The method of claim 9, wherein reorienting the scan signal is performed while the energy source remains stationary.

12. The method of claim 8, wherein the scan signal comprises an infrared signal and is reflected by an infrared reflector on the first device, and wherein the charging signal is received by a photovoltaic cell on the first device.

13. The method of claim 8, further comprising: upon ceasing transmission of the charging signal, resuming the scan of the environment until detecting, via the sensing device, a subsequent reflected scan signal reflected by a reflector of a second battery-operated device.

14. A system for detecting and wirelessly recharging one or more battery-operated devices disposed within an environment, the system comprising:
- at least a first battery-operated device comprising a battery, a reflector, and a light source;
- a charging device comprising an energy source, a sensing device, and a controller coupled with the energy source and the sensing device, the controller configured to:
  - transmit a light-based scan signal using the energy source;
  - perform a scan of the environment by reorienting the scan signal within the environment;
  - detect, during the scan and via the sensing device, a reflected scan signal reflected by the reflector of the first battery-operated device, wherein detecting the reflected scan signal corresponds to a first orientation of the scan signal;
  - upon detecting the reflected scan signal:
    - pause the scan of the environment; and
    - transmit, with a predetermined second orientation relative to and different than the first orientation, a charging signal from the energy source to a sensor of the first battery-operated device;
  - receive, at the sensing device, a second signal from the light source of the first device indicating that the battery of the first battery-operated device is fully charged; and
  - cease transmission of the charging signal in response to the received second signal.

15. The system of claim 14, wherein the charging device further comprises one or more mirrors coupled with the controller and arranged to further reflect the reflected scan signal to the sensing device, wherein the one or more mirrors are configured to rotate by performing at least one of pan, tilt, and roll, wherein reorienting the scan signal comprises transmitting control signals to rotate the one or more mirrors relative to the energy source, and wherein transmitting the charging signal to the first battery-operated device is performed using the one or more mirrors.

16. The system of claim 15, wherein the scan signal is transmitted using the one or more mirrors.

17. The system of claim 16, wherein each of the scan signal and the charging signal comprise infrared signals, wherein the scan signal is reflected by an infrared reflector on the first device, and wherein the charging signal is received by a photovoltaic cell on the first device.

18. The system of claim 14, wherein the controller is further configured to transmit data to the first device by encoding data in the charging signal.

19. The system of claim 14, wherein the light source of the first device comprises an infrared light-emitting diode (LED).

20. The system of claim 19, wherein the first device comprises a processor coupled with the battery and configured to generate the second signal using the infrared LED upon determining that the battery has reached a full state.

* * * * *